United States Patent [19]

Tideswell et al.

[11] 4,107,229

[45] Aug. 15, 1978

[54] POLYURETHANE ACRYLATES OF HYDROXYALKYLATED NOVOLAC RESIN

[75] Inventors: Richard B. Tideswell, Buffalo; Jeffrey E. Selley, East Amherst, both of N.Y.

[73] Assignee: Hooker Chemicals & Plastics Corporation, Niagara Falls, N.Y.

[21] Appl. No.: 693,815

[22] Filed: Jun. 7, 1976

[51] Int. Cl.$^2$ ............................................. C08G 18/00
[52] U.S. Cl. .................................. 260/841; 260/844; 260/859 R; 560/129; 560/132; 526/301
[58] Field of Search .................. 260/841, 844, 859 R, 260/77.5 MA; 560/129, 132

[56] References Cited

U.S. PATENT DOCUMENTS

| | | | |
|---|---|---|---|
| 3,523,093 | 8/1970 | Stamberger | 260/841 |
| 3,632,789 | 1/1972 | Wilhelm et al. | 260/844 |
| 3,825,518 | 7/1974 | Foster et al. | 260/77.5 MA |
| 3,876,728 | 4/1975 | Kuroda et al. | 260/859 R |
| 3,919,351 | 11/1975 | Chang et al. | 260/844 |
| 3,929,929 | 12/1975 | Kuehn | 260/859 R |
| 4,018,851 | 4/1977 | Baccei | 260/859 R |

FOREIGN PATENT DOCUMENTS 853,768  9/1970  Canada .................................... 260/841

*Primary Examiner*—M. J. Welsh
*Attorney, Agent, or Firm*—Peter F. Casella; James F. Mudd; William G. Gosz

[57] ABSTRACT

Vinyl terminated, fully reacted urethane compositions comprise the reaction product of polyisocyanate, an hydroxyalkylated novolac and an ethylenically unsaturated alcohol. The vinyl terminated compositions are copolymerizable with ethylenically unsaturated monomers to produce thermoset polymers characterized by excellent physical properties and a high degree of resistance to acids and alkalies. The polymers are especially useful in the manufacture of molded articles and laminates and in the formulation of marine coatings.

32 Claims, No Drawings

POLYURETHANE ACRYLATES OF HYDROXYALKYLATED NOVOLAC RESIN

BACKGROUND OF THE INVENTION

This invention relates to vinyl terminated polyurethane compositions which may be copolymerized with ethylenically unsaturated monomers to produce thermoset polymers characterized by excellent corrosion resistance and high impact strength.

A variety of corrosion-resistant polymeric materials have been developed and used for the manufacture of chemical processing equipment such as ducts, pipe, hoods, stacks, processing tanks, storage tanks and the like for the handling of corrosive liquids and vapors. Although corrosion resistance is a major consideration in the selection of a polymer for such purposes, various other factors such as cost, ease of fabrication, mechanical strength, thermal stability, and impact resistance must also be considered. For example, the rate of failure of prior art corrosion resistant polymers through impact or vibration has been a major problem. Polyester resins such as those derived from bisphenol A and fumaric acid are noted for exceptional thermal and hydrolytic stability and have been used extensively in the manufacture of equipment which will withstand strong acids and bases, However, such polymers, even when reinforced with glass fiber and the like are brittle and tend to crack or fracture on impact or flexure. Cracks produced by impact or flexure often lead to chemical attack and deterioration, resulting in part from a wicking action at the damaged impact site. Various prior art attempts to produce polymeric materials having improved impact strength have generally resulted in a diminishing of corrosion resistance, thermal stability or other desirable property of the polymer.

It is known that the presence of urethane linkages may contribute to the corrosion resistance of a polymer. Thus, for example, it is known to prepare corrosion resistant polymers from monomers having urethane linkages and ethylenically unsaturated terminal groups. U.S. Pat. No. 3,297,745 discloses the preparation of such monomers by the reaction of one mole of a dihydric compound such as an alkylene, arylene or polyalkylene ether glycol, or a dihydric phenol such as a bisphenol, naphthalene diol, or the like with two moles of a diisocyanate to form a diisocyanate having two urethane linkages and subsequent reaction of the diurethane diisocyanate with two moles of an ethylenically unsaturated alcohol, such as an hydroxyalkyl acrylate. The resultant acrylate terminated tetraurethane monomer may polymerized or copolymerized with a vinyl monomer, such as styrene, to form corrosion-resistant polymers or copolymers.

A wide variety of other polyurethane compositions are known and used commercially in the preparation of molded articles, laminates, coatings, films, adhesives, rigid and flexible foams and the like. The wide variation of polyurethane compositions and properties thereof stems from the ability of isocyanates to react with a variety of organic compounds having active hydrogen-containing groups. Among the many such compositions known in the art are polyurethanes prepared from polyisocyanates and various polyols, including for example polyether polyols, polyester polyols, polydienediols, novolacs, oxyalkylated novolacs, and others.

In U.S. Pat. No. 3,278,293, for example, it is disclosed that improved physical properties and self-extinguishing characteristics may be obtained in polyurethane compositions derived from specific mixtures of polyether polyols, novolac resins and polyisocyanates.

U.S. Pat. No. 3,497,465 discloses the preparation of polyurethanes especially useful in low temperature applications from the reaction of an organic polyisocyanate with a composition comprising an oxyalkylated phenol-aldehyde resin, a polyol prepared by reacting a polyhydric alcohol and a mono epoxide, a dihydric alcohol, such as ethylene glycol, an alkanolamine, and a phosphorus compound.

U.S. Pat. No. 3,538,040 discloses the preparation of curing resins for foundry sands, by reacting an organic polyisocyanate with an oxyalkylated phenol-aldehyde or phenol-ketone condensate. U.S. Pat. No. 3,686,106 discloses curable foundry binders of an oil modified hydroxyalkylated novolac resin, an unsaturated petroleum polymer, a solvent and an organic polyisocyanate.

The foregoing prior art illustrates the wide variety of polyurethane compositions that may be prepared by reaction of a polyisocyanate and various polyols, including novolacs and oxyalkylated novolacs. It will be appreciated by those skilled in the art that despite the wide selection of known compositions and properties, a continuing need exists for new and better components and specific combinations of components for polyurethane compositions that will provide improved properties for various special applications, such as the manufacture of corrosion resistant articles and materials.

It is an object of this invention to provide novel polyurethane compositions which may be copolymerized with an ethylenically unsaturated monomer. It is a further object to provide novel thermoset polyurethane compositions well suited for use in the manufacture of corrosion-resistant articles of manufacture. It is a still further object to provide polymeric materials and articles of manufacture having superior corrosion resistant properties as well as high impact strength.

SUMMARY OF THE INVENTION

It has now been found that thermoset polymer compositions having excellent corrosion resistance and impact strength are prepared from compositions comprising (A) an ethylenically unsaturated monomer and (B) a vinyl terminated polyurethane composition comprising the reaction product of an organic polyisocyanate, an hydroxyalkylated novolac, and an ethylenically unsaturated alcohol.

the novel polymer compositions of this invention may be employed as coatings or fabricated by conventional techniques into various shapes or articles of manufacture such as reinforced laminates, castings, moldings and the like. Thus in one aspect the present invention relates to vinyl terminated polyurethane compositions and in a second aspect to thermoset polymer compositions prepared therefrom. In still another aspect, this invention relates to articles of manufacture or coatings prepared from such polymer compositions and to a method for the preparation thereof.

In the preparation of the vinyl terminated polyurethane compositions of this invention an organic polyisocyanate is reacted on one side with the hydroxyl group of an ethylenically unsaturated alcohol, such as an hydroxyalkylacrylate, and on the other side with an hydroxyl group of an hydroxyalkylated novolac.

The hydroxyalkylated novolacs useful in the preparation of the polyurethane compositions are those characterized by the formula:

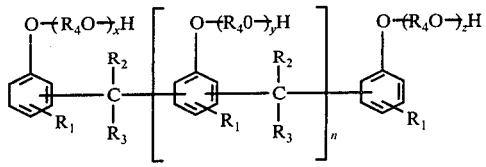

wherein $n$ has an average value of about 0.2 to 6, preferably about 0.5 to about 3;

$x$, $y$ and $z$ are integers from 1 to 25, preferably about 1 to about 10;

$R_1$ is independently selected from the group consisting of hydrogen, fluorine, chlorine, bromine, a hydrocarbon radical, a halogen-substituted hydrocarbon radical, a hydrocarbon ketone radical and a hydrocarbon carboxylic radical;

$R_2$ and $R_3$ are independently selected from the group consisting of hydrogen, a hydrocarbon radical, and a halogen-substituted hydrocarbon radical; and $R_4$ is a hydrocarbon radical.

Where $R_1$, $R_2$, $R_3$ and/or $R_4$ is a hydrocarbon or substituted hydrocarbon radical, the preferred hydrocarbon radicals are those containing up to about 12 carbon atoms.

The preferred hydroxyalkylated novolacs are those characterized by the formula shown hereinabove wherein $R_1$, $R_2$ and $R_3$ are hydrogen and $R_4$ is a hydrocarbon radical containing 2 to 6 carbon atoms.

The hydroxyalkylated novolac can be prepared by reacting (A) a fusible, organic solvent-soluble condensation product of a phenol and an aldehyde or ketone containing condensate units having reactive phenolic hydroxyl groups and (B) a substance reactive with the phenolic hydroxyl group and selected from the group consisting of a mono-oxirane ring compound, an alkylene halohydrin, and an alkylene carbonate and mixtures thereof. The hydroxylalkylated novolac can also be prepared by first reacting a phenol with the substance reactive with the phenolic hydroxyl groups, and thereafter condensing the modified phenol with an aldehyde or ketone.

The fusible, organic solvent-soluble condensation products of a phenol and an aldehyde or ketone (novolacs) suitable for use in preparing the hydroxyalkylated novolacs of this invention are well known in the art and are described for example in U.S. Pat. No. 3,538,040, the disclosure of which is incorporated herein by reference.

The hydroxyalkylated novolac condensation products preferably contain no free reactive phenolic groups, i.e., less than about 5%, but preferably less than about 0.5% of the phenolic hydroxyl present originally in the phenol-aldehyde or phenol-ketone condensate.

The preferred method of hydroxyalkylation to produce the hydroxyalkylated novolacs useful in the invention is by reaction of the condensation products (novolacs) with compounds containing a mono-oxirane ring. Monomeric epoxides, such as ethylene oxide, propylene oxide, butylene oxide, cyclohexane oxide, or the like or mixtures thereof are preferred. Catalysts for the reaction of the oxirane ring compounds and phenolic hydroxyl groups are alkali or alkaline earth hydroxides, primary amines, secondary amines, tertiary amines or basic alkali salts such as sodium, potassium, and lithium hydroxides; amines such as methyl, dimethyl, diethyl, tripropyl, and the like; salts of strong bases and weak acids, such as sodium acetate or sodium benzoate. The hydroxyalkylation reactions can be carried out at 50°–250° C, but the hydroxyalkylation of phenols is preferably performed at 50°–150° C. The hydroxyalkylation of the phenolic condensates is preferably performed at 150° to 250° C.

The phenolic hydroxyl of the phenolic condensates can also be hydroxyalkylated by reacting it with alkylene halohydrins using equivalent amounts of an alkali metal hydroxide to bring about the reaction. Suitable alkylene halohydrins include, for example, ethylene chloro or bromohydrins, propylene chloro or bromohydrins, 2,3-butylene chloro or bromohydrins, glycerol chloro or bromohydrins or the like. Another method for hydroxyalkylating a phenolic novolac is by reaction with an alkylene carbonate; such as ethylene carbonate or propylene carbonate, using a catalyst such as sodium or potassium carbonate.

Suitable organic polyisocyanates which may be employed in the preparation of the polyurethane compositions of this invention include a wide variety of aromatic, aliphatic and cycloaliphatic polyisocyanates. Typical polyisocyanates which may be employed include for example, 4,4′-methylenebis (phenylisocyanate); 2,4-toluene diisocyanate; 2,6-toluene diisocyanate; 1,5-naphthalene diisocyanate; tetramethylene diisocyanate; hexamethylene diisocyanate; pentamethylene diisocyanate; cyclohexyl-2,4-diisocyanate; 4,4′-methylenebis (cyclohexyl) diisocyanate; 2,4,6-tolylene triisocyanate; 4,4′,4″-triphenylmethane triisocyanate; polyaryl polyisocyanates; and the like, as well as mixtures of such isocyanates. The preferred organic polyisocyanates are the diisocyanates, typified, for example, by the formula $OCNR_5NCO$ wherein $R_5$ is an aryl, aliphatic or cycloaliphatic group.

Ethlenically unsaturated alcohols which may be employed are those characterized by the formula

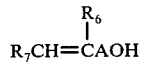

wherein $R_6$ is —H, or —$CH_3$; $R_7$ is —H, —$CH_3$, or —$C_6H_5$; and A is a divalent organic radical selected from the group consisting of

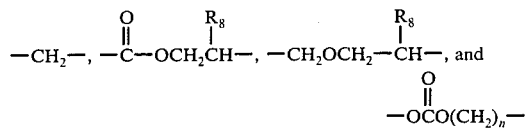

wherein $n$ is 3 to about 12, $R_8$ is —H, —$(CH_2)_m$—$CH_3$, —$CH_2CL$,

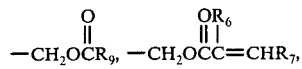

$CH_2OR_9$, or —$CH_2OCH_2CH=CHR_7$ wherein m is an integer from zero to 10, and $R_9$ is a phenyl or halogenated phenyl radical, alkyl or halogenated alkyl radical having from 2 to 4 carbon atoms, benzoxy or halogenated benzoxy radicals, phenoxy or halogenated phenoxy radical and $R_7$ is as defined above.

The preferred ethylenically unsaturated alcohols are hydroxyalkyl acrylates characterized by the formula

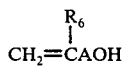

wherein $R_6$ is —H or —CH$_3$; and

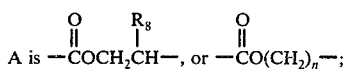

wherein $n$ is 3 to 12; and

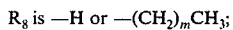

wherein $m$ is zero to 10.

Among the ethylenically unsaturated alcohols which may be employed are included, for example, allyl alcohol, 1-methyl allyl alcohol, 2-methyl allyl alcohol, allyl 2-hydroxyethyl ether, hydroxyalkyl acrylates and the like. The preferred ethylenically unsaturated alcohols are the hydroxyalkyl acrylates. The term "hydroxyalkyl acrylate" is employed in this specification and claims in a generic sense to include hydroxyalkyl acrylates as well as hydroxyalkyl methacrylates. Where reference is made to a specific compound of this type the appropriate species name — acrylate or methacrylate — is employed. Suitable hydroxy alkyl acrylates include, for example, 2-hydroxyethyl acrylate, 2-hydroxyethyl methacrylate, 2-hydroxy-1-methylethyl acrylate, 2-hydroxyl-1-methylethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 4-hydroxybutyl acrylate, 4-hydroxybutyl methacrylate, 2-hydroxypentyl acrylate 2-hydroxypentyl methacrylate, 5-hydroxypentyl acrylate, 5-hydroxypentyl methacrylate, 2-hydroxyhexyl acrylate, 2-hydroxyhexyl methacrylate, 6-hydroxyhexyl acrylate, 6-hydroxyhexyl methacrylate, 2-hydroxyheptyl acrylate, 2-hydroxyheptyl methacrylate, 7-hydroxyheptyl acrylate, 7-hydroxyheptyl methacrylate, 2-hydroxyoctyl acrylate, 2-hydroxyoctyl methacrylate, 2-hydroxydodecenyl acrylate, 2-hydroxydodecenyl methacrylate, 2-hydroxy-3-chloropropyl acrylate, 2-hydroxy-3-chloropropyl methacrylate and the like as well as mixtures of these. The preferred hydroxyalkyl acrylates or methacrylates are those wherein the alkyl group is 2 to 4 carbon atoms and most preferably hydroxypropyl methacrylate.

The preparation of the urethane acrylates of this invention may be effected by first reacting the hydroxyalkylated novolac with an organic diisocyanate to form an isocyanate-terminated urethane, and subsequently reacting that intermediate isocyanate with an ethylenically unsaturated alcohol to form a vinyl terminated polyurethane, substantially free of unreacted isocyanate or hydroxyl groups. Alternatively, the three reactants, that is, the hydroxyalkylated novolac, diisocyanate and ethylenically unsaturated alcohol may be reacted together in a single step. In a preferred mode of preparation the ethylenically unsaturated alcohol is first reacted with the diisocyanate to form an isocyanate - terminated urethane, and subsequently that intermediate isocyanate is reacted with the hydroxyalkylated novolak. The reaction may be illustrated, in an idealized manner by the equation:

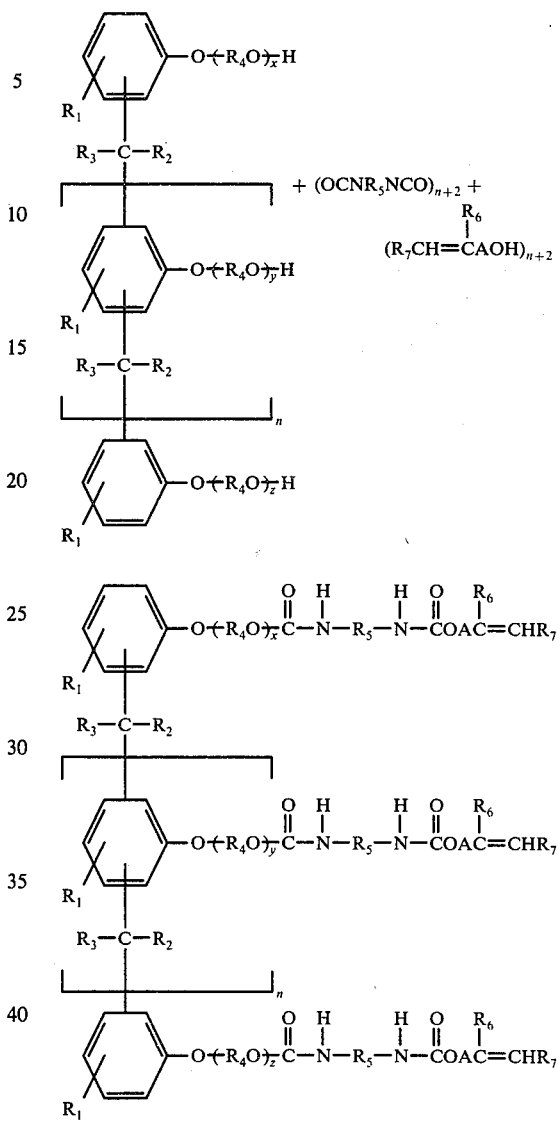

It will be appreciated that the foregoing equations and formulas represent idealized reactions and products and that various other side reactions may take place and other side products may be formed, normally in minor amounts.

The proportions of the components of the polyurethane, that is the hydroxyalkylated novolac, ethylenically unsaturated alcohol, and polyisocyanate, may vary but are preferably in a range sufficient to provide a ratio of NCO:OH of about 0.75 to about 1.3 and most preferably about 1 to provide a substantially fully reacted polyurethane. The proportions of the hydroxyl-bearing reactants, that is the oxyalkylated novolac and the ethylenically unsaturated alcohol, necessary to provide the aforementioned ratio of NCO:OH may vary but is preferably in the range of about 0.75 to about 2.3 hydroxyl equivalents of hydroxyalkylated novolac per mole of ethylenically unsaturated alcohol. Most preferably the proportions are such as to provide about 0.75 to about 1.3 hydroxyl equivalents of hydroxyalkylated novolac and about 0.15 to 1.3 moles of ethylenically unsaturated alcohol per mole of diisocyanate.

The urethane forming reaction proceeds readily at moderate temperatures, such as less than about 100° Celsius, preferably about 10° to about 90° Celsius, without the aid of a catalyst. If desired, the reaction may be carried out in the presence of a conventional catalyst for isocyanate reactions such as tetramethylene guanidine, tetramethylenediamine, triethylenediamine, trimethylethylenediamine, dimethylethanolamine, trimethylamine, triethylamine, N-ethyl morpholine, N-ethyl piperidine, lead octoate, stannous oleate, stannous octoate, dibutyl tin dilaurate, stannic chloride, antimonous caprylate, antimony naphthenate, antimonous chloride, phenylmercuric acetate and the like as well as mixtures of such catalysts.

The presence of moisture during the urethane forming reactions may result in the occurence of undesired isocyanate side-reactions, such as biuret formation. To avoid or minimize the occurence of such side-reactions, the reaction mixture should be substantially anhydrous, the moisture content of the reactants being preferably less than about 0.1 percent by weight. The urethane forming reactions may be carried out in the presence of a suitable inert solvent such as benzene, toluene or the like. Preferably, the reaction solvent is styrene, methyl methacrylate or other ethylenically unsaturated monomer which is also suitable for subsequent copolymerization with the hydroxyalkylated novolac urethane acrylate reaction product. The amount of reaction solvent employed may vary considerably as necessary to provide a suitable viscosity of the reaction mixture. When styrene or other ethylenically unsaturated monomer is employed as the reaction solvent it is preferred to incorporate in the reaction mixture, a suitable amount of a vinyl polymerization inhibitor to prevent premature polymerization of the unsaturated monomer. Suitable polymerization inhibitors such as catechol, hydroquinone, toluhydroquinone, benzoquinone, and the like may be employed, typically in amounts of about 0.001 to 1 weight percent of the reaction mixture.

The vinyl terminated urethane composition thus prepared may be copolymerized with an ethylenically unsaturated monomer to produce a thermoset polymer composition characterized by excellent physical properties and a high degree of resistance to acids and alkalies. Suitable ethylenically unsaturated monomers which may be employed in the preparation of the thermoset polymer include, for example, styrene, chlorostyrenes, methyl styrenes, vinyl benzyl chloride, divinylbenzene, vinyl toluene, fluorostyrene, unsaturated esters such as methyl acrylate, methyl methacrylate, as well as lower aliphatic esters of acrylic or methacrylic acids, and the like as well as mixtures of such unsaturated monomers. The ethylenically unsaturated alcohol can act as the unsaturated monomer if reacted in stoichiometric excess in generating the urethane acrylate. Furthermore, an excess of the unsaturated alcohol may be employed for this purpose in admixture with other unsaturated monomers.

The proportion of unsaturated monomer to vinyl terminated urethane may vary within the ultimate limits of each as necessary to produce an infusible thermoset resin. Generally the weight proportion of unsaturated monomer is about 0.5 to about 2.0, and preferably about 0.75 to about 1.3 part of unsaturated monomer per part of vinyl terminated urethane product.

Polymerization catalysts are preferably added to the mixture of unsaturated monomer and vinyl terminated urethane to effect setting or curing. Catalysts of the free radical type such as benzoyl peroxide, acetyl peroxide, lauroyl peroxide, methylethyl ketone peroxide, cumene hydroperoxide and the like may be employed, typically in proportion of about 0.01 to about 10 weight percent of the reaction mixture depending on the efficiency of their action and whether or not a polymerization inhibitor is present in the reaction mixture. Furthermore, various known polymerization promotors such as dimethylaniline or the like may be employed, typically in amounts equal to or less than the amount of catalyst employed. The polymerizable composition, thus prepared, may be applied as a coating or molded or cast in a known manner. Typically, the resultant thermoset composition may be cured at ambient conditions for up to about 24 hours and post cured at an elevated temperature, such as about 100° C for a shorter period such as one to two hours.

In an alternative embodiment of this invention, it has been found that still further improvement in flexibility and impact strength may be achieved by incorporation of a minor proportion of an hydroxyalkylated polyol in the hydroxyalkylated novolac reactant. The hydroxyalkylated polyol may be prepared by reaction of a polyol with a compound containing a mono-oxirane ring such as ethylene oxide, propylene oxide, butylene oxide, cyclohexane oxide or the like or mixtures of such compounds. The resultant hydroxyalkylated polyol may be added to the hydroxyalkylated novolac and/or directly to the reaction mixture containing the aforementioned isocyanate reactant. Preferably the hydroxyalkylated polyol is formed in situ during the preparation of the hydroxyalkylated novolac by addition of the polyol to the novolac composition prior to the hydroxyalkylation step. Preferred polyols which may be employed for this purpose are low molecular weight polyols having up to about 6 carbon atoms, and include, for example, glycerine, pentaerythritol, trimethylol ethane, and trimethylol propane, glycols such as propylene glycol, and the like, as well as mixtures of such polyols. The amount of polyol incorporated in the novolac composition may vary considerably but is preferably in the range of about 5 to 75 parts by weight and most preferably about 40 to 60 parts by weight per 100 parts of novolac.

The vinyl-terminated urethane compositions of this invention may be employed as coating compositions, either alone or in admixture with conventional coating formulation additives such as solvents, fillers, pigments and the like. Furthermore they may be combined with a reactive solvent, such as styrene or other copolymerizable ethylenically unsaturated monomers such as those described hereinabove to form coating compositions of the type known as 100 percent solids coating compositions. The coating compositions may be applied by conventional means, such as brushing, spraying, dipping, rolling, and the like to form a durable corrosion resistant coating. The salt water resistance of these coatings makes them well suited for use as marine finishes. The coatings may be cured by known means, such as exposure to heat, light, electron radiation x-ray radiation, or with the aid of known peroxide catalysts and promotors.

It is to be understood that fillers, dyes, pigments, lubricants, solvents, fire retardants, and various other adjuvants and modifying agents may be incorporated in the compositions of this invention in order to obtain or accentuate any given property. Furthermore moldings and laminates may be prepared by the addition of suitable reinforcing agents such as glass rovings, glass mat, asbestos fiber and the like.

The following specific examples are provided to further illustrate this invention and the manner in which it may be carried out. It will be understood that the specific details given in the examples have been chosen for purposes of illustration and are not to be construed as a limitation on the invention. In this specification and claims, unless otherwise indicated, all parts and percentages are by weight and all temperatures are in degrees Celsius.

EXAMPLES 1-6 — PREPARATION OF THE HYDROXYALKYLATED NOVOLAC RESIN

EXAMPLE I

A mixture of 1880 parts of phenol, 303 parts of paraformaldehyde, and 9.5 parts of maleic anhydride catalyst was heated to reflux temperatures of 102° to 105° C and maintained thereat for one hour. The reaction product was dehydrated and dephenolated by heating to a final temperature of 210° C at 70mm Hg. The product was 1373 parts of a novolac resin characterized by 1.425 ArOH per methylene bridge. Then 0.7 parts of potassium hydroxide (0.05% by weight, based on novolac weight) was added and propylene oxide was added at a temperature of about 165°–195° C until a weight increase of 855 parts was attained. The resultant condensation product had an hydroxyl number of 336 and a calculated proportion of 1.1 mole of propylene oxide per mole of phenolic hydroxyl in the novolac.

EXAMPLE 2

An hydroxyalkylated novolac was prepared as follows: 3000 parts of phenol, 13 parts of maleic anhydride catalyst and 6 parts of an alkylaryl sulfonate type of wetting agent were introduced into a jacketed reactor and heated to about 100° C. Then 847 parts of a 49% aqueous formaldehyde solution was added at such a rate that the heat of reaction provided a vigorous reflux. Refluxing was continued for an additional hour. The reaction product was dehydrated at 180° C and then dephenolated to 220° C at a pressure of 50 mm Hg. Approximately 2070 parts of phenol-aldehyde condensate was produced. Four parts of potassium hydroxide was introduced to the reactor. The reactor temperature was maintained at about 165° to 195° C while 1383 parts of propylene oxide was added thereto. The resultant condensation product had an hydroxyl number of 322.

EXAMPLE 3

An hydroxyalkylated phenol-aldehyde novolac was prepared following the procedure of Example 2 except that a total of 1692 parts of propylene oxide was added.

EXAMPLE 4

An hydroxyalkylated phenol-aldehyde novolac was prepared as in Example 2 until the addition of 2100 parts of propylene oxide was complete.

EXAMPLE 5

An hydroxyalkylated phenol-aldehyde novolac was prepared by introducing 13,080 parts phenol, 52 parts of maleic anhydride catalyst and 26 parts of a wetting agent into a jacketed reactor and heating to 100° C. Then 4840 parts of a 45% aqueous formaldehyde solution were added and reacted as in Example 2. The reaction was dehydrated and dephenolated as in Example 2 to yield 10,000 parts of novolac. Potassium hydroxide, 0.2% by weight on the novolac condensate, was added and propylene oxide was added at 165° to 195° C until 1.45 propylene oxide had reactor per phenolic hydroxyl.

EXAMPLE 6

A glycerin-modified hydroxyalkylated phenol-aldehyde novolac composition was prepared by introducing 522 parts phenol, 2 parts of maleic anhydride catalyst and 1 part of a wetting agent into a jacketed reactor and heating to 100° C. Then, 113 parts of a 45% aqueous formaldehyde solution were added and reacted as in Example 2. The reaction was dehydrated and dephenolated as in Example 2 to yield 261 parts of phenol-aldehyde novolac condensate. To this was added 125 parts of glycerine and 1.5 parts of potassium hydroxide. Propylene oxide was then added to the reactor until the addition of 296 parts was complete. Ethylene oxide was then added to the reactor until the addition of 313 parts of complete.

The characteristics of the hydroxyalkylated novolacs prepared according to Examples 1-6 are set forth in Table I, below.

TABLE I

| Ex. No. | Ratio of Phenol to Aldehyde in Base Condensate | Novolac Functionality | Ratio of Alkylene Oxide to Hydroxyl Group | Hydroxyl No. |
|---|---|---|---|---|
| 1 | 3/2 to 4/3 | 3.5 | 1.1 propylene oxide | 336 |
| 2 | 3/2 | 3. | 1.17 propylene oxide | 322 |
| 3 | 3/2 | 3. | 1.45 propylene oxide | 293 |
| 4 | 3/2 | 3. | 1.85 propylene oxide | 255 |
| 5 | 4/3 | 3.7 | 1.45 propylene oxide | 285 |
| 6 | 2/1 to 3/2 | 2.7 | 0.8 propylene oxide & 1.1 ethylene oxide | 355 |

EXAMPLES 7-12 — PREPARATION OF VINYL-TERMINATED POLYURETHANES

The following examples illustrate the preparation of the vinyl-terminated polyurethane compositions of this invention.

EXAMPLE 7

A vinyl terminated, fully reacted urethane acrylate was prepared by charging 422 parts of the oxypropylated novolac prepared in Example 1 (2.65 hydroxyl equivalents), 381 parts of hydroxypropyl methacrylate (2.65 moles), 1283 parts of styrene solvent, and 0.28 parts of p-benzoquinone inhibitor to a reactor and heating to 50° C to effect dissolution of the reactants. To the solution was added 460 parts (2.65 moles) of toluene diisocyanate (a commercially available mixture of approximately 80 percent 2,4-isomer and 20 percent 2,6-isomer) and the solution was heated and maintained at about 70° – 80° C with stirring for about 4 hours.

EXAMPLES 8-12

A series of fully reacted urethane acrylates were prepared by reacting one hydroxyl equivalent of the hydroxyalkylated novolacs of Examples 2 through 6 and one mole of hydroxypropylmethacrylate with one mole of toluene dissocyanate following the procedure of Example 7. The properties of the polyurethane acrylates thus prepared are set forth in Table II, below.

TABLE II

| Polyurethane Acrylate Example Number | Hydroxy-alkylated Novolac Ex. No. From Table I | Brookfield Visc. at 25° C at 100 (phr) styrene | Gardner H Color | % NCO |
| --- | --- | --- | --- | --- |
| 7 | 1 | 336 | 3 | — |
| 8 | 2 | 300 | 6 | 0.58 |
| 9 | 3 | 650 | 7 | 0.42 |
| 10 | 4 | 300 | 6 | 0.43 |
| 11 | 5 | 600 | 7 | — |
| 12 | 6 | 300 | 10 | 0.36 |

EXAMPLE 13

A ⅛ inch casting was made from the prepared polyurethane acrylate composition of Example 7. The casing was cured using 2% of a paste containing 50% benzoyl peroxide in tricresyl phosphate as catalyst with 0.125% dimethyl aniline as promoter. The casting was allowed to cure at room temperature for 24 hours and was then post cured at 110° C for one hour. The properties of the casting were:

| | |
| --- | --- |
| Flexural Strength, psi | 14,200 |
| Flexural Modulus | $4.3 \times 10^5$ |
| Tensile Strength, psi | 7,300 |
| % Elongation at Break | 1.47 |

EXAMPLE 14

A ⅛ inch laminate was prepared from 3 — plies of 2 ounce glass mat using the above prepared composition of Example 7 as a binder therefore. The laminate was cured using 2% of a paste containing 50% benzoyl peroxide in tri cresyl phosphate as catalyst with 0.125% dimethylaniline promoter. The laminate was allowed to cure for 24 hours at room temperature and then post-cured at 110° C for 2 hours. The properties of the laminate were:

| | |
| --- | --- |
| Flexural Strength, psi | 24,400 |
| Tensile Strength, psi | 16,900 |
| Modulus Flexure | $9.12 \times 10^5$ |
| Barcol Hardness | 55 |
| % Glass in Laminate | 30 |

EXAMPLE 15

A ⅛ laminate was prepared from two plies veil, 2 plies of 1-½ ounce glass mat using the above prepared composition of Example 7 as a binder therefore. The laminate was cured using 2% of a paste containing 50% benzoyl peroxide in tri cresyl phosphate as catalyst with 0.125% dimethyl aniline as promoter. The laminate was allowed to cure at room temperature for 24 hours and then post-cured at 110° C for 2 hours.

The corrosion resistance of the polymer; i.e. the resistance to attack by chemical reagents, was demonstrated by immersing samples of the laminate prepared above in various reagents for 96 hours under reflux conditions, and measuring the weight loss occasioned by this treatment. The results of this test follow:

| Reagent | % Weight Change |
| --- | --- |
| ½% NaOH | 1.03 |
| 10% NaOH | 2.43 |
| 10% H$_2$SO$_4$ | 1.02 |
| Distilled H$_2$O | 0.93 |

The samples in ½% NaOH, 10% H$_2$SO$_4$ and distilled water were not substantially changed. The samples in 10% NaOH showed slight deterioration. These results clearly indicate the excellent corrosion resistance of the styrenated polymer of this example. Glass mat laminates made with the new resin undergo some attack in caustic even though the resin itself is resistant to strong alkali. This is because glass fibers near the surface can become exposed and permit wicking of the corrosive solution into the body of the laminate. Laminates made from polypropylene cloth were inert to caustic.

The impact resistance of the prepared polyurethane acrylate compositions was demonstrated in the following manner using a dropping ball test as described in ASTM D-2444. Laminates were prepared as in Example 15 from the polyurethane acrylate compositions. A ½ lb. ball was dropped from a height of 14 inches on to the laminate. The average diameter of the shatter area is reported in inches. The test was repeated from a drop height of 30 inches.

| Polyurethane Acrylate Composition From Table II | Average Diameter of Shatter Area, Inches | |
| --- | --- | --- |
| | 14 Inch Drop | 30 Inch Drop |
| 8 | 0.4 | 1.2 |
| 9 | 0 | 0.9 |
| 10 | 0 | 1.1 |
| 12 | 0 | 0.5 |
| Bisphenol-A Fumarate (BPA) | 1 | 2 |
| Flexibilized BPA Fumarate | 0.9 | 1.25 |

The table includes a commercially available BPA fumarate and flexibilized version (having additional oxypropylation) for comparison. Both BPA fumarate types are commonly used in the chemical resistant field. The polyurethane acrylate compositions are seen to give much better impact resistance. Furthermore, it will be noted that still additional advantage in impact strength is achieved in the composition of Example 12, prepared from the glycerin-modified oxyalkylated novolac of Example 6.

To demonstrate the further improvements in impact strength achieved through the incorporation of an hydroxyalkylated polyol in the compositions of this invention, a series of compositions were prepared with and without a polyol modifier and tested for impact strength. The preparation and testing of the compositions is described in the following examples.

EXAMPLE 16

A glycerin-modified oxypropylated novolac was prepared as follows:

A. A mixture of 455 parts of phenol, 1.7 parts of maleic anhydride catalyst, and 1 part of an alkylaryl sulfonate type of wetting agent was introduced into a jacketed reactor and heated to about 100° C. Then 91.5 parts of a 48.5 percent aqueous formaldehyde solution was added at a rate such that the heat of reaction provided a vigorous reflux. Refluxing was continued for an additional hour. The reaction mixture was dehydrated at 180° C and then dephenolated to 225° C at a pressure of 50 millimeters of mercury.

B. Then 113 parts of glycerine and 1.4 parts of potassium hydroxide was introduced to the reactor. The reaction temperature was maintained at about 165° to 195° C while 644 parts of propylene oxide was added thereto. The reaction mixture was cooled to 180° C and 3.1 parts of butyl acid phosphate was added and mixed while the temperature was maintained at about 180° C for about one hour. The resulting condensation product had an hydroxyl number of 328.

EXAMPLE 17

A vinyl terminated, fully reacted urethane acrylate was prepared from the glycerine-modified hydroxyalkylated novolac of Example 16 in the following manner: A mixture of 1155 parts of styrene solvent, 415 parts of hydroxypropyl methacrylate, and 0.4 parts of p-benzoquinone was stirred while 519 parts of toluene diisocyanate (a mixture of approximately 80 percent 2,4-isomer and 20 percent 2,6-isomer) was added slowly so that the temperature did not exceed 45° C. The temperature was then raised to 55° C and maintained thereat for about 30 minutes. Then 510 parts of glycerine-modified hydroxypropylated novolac, prepared as in Example 16 was added and the reaction mixture was heated to 65° C an maintained at that temperature for about 4 hours. The liquid resin, thus prepared had a Brookfield viscosity of 120 centipoises at 25° C.

EXAMPLE 18

Following the procedure of Example 15, a laminate was prepared from the vinyl terminated urethane acrylate of Example 17. Impact resistance of the laminate was measured using the above-described falling ball test. A one half pound ball dropped from 30 inches (1.25 ft-lbs) yielded a shatter area measuring 0.2 inches in diameter. A one pound ball dropped from 30 inches (2.5 ft-lbs) yielded a shatter area 0.4 inches in diameter.

EXAMPLE 19

A propylene glycol-modified hydroxyalkylated novolac was prepared in the following manner. A phenolic novolac was prepared as described in Example 16 A. To 404 parts of this phenolic novolac were added 193 parts of propylene glycol and 2.3 parts of potassium hydroxide. Then propylene oxide was added in the manner described in example 16 B until a total of 1030 parts of propylene oxide had reacted. The resultant condensation product had an hydroxyl number of 275.

EXAMPLE 20

An hydroxyalkylated novolac without a glycol modifier was prepared following the procedure of Example 19 except that: no propylene glycol was added; potassium hydroxide was added in the amount of 1.6 parts; and propylene oxide was added until a total amount of 425 parts had reacted. The resultant condensation product had an hydroxyl number of 259.

EXAMPLES 21–25

A series of vinyl-terminated urethane acrylates in styrene were prepared following the procedure of Example 17 except that the composition was varied as shown in the table below:

| Example Number Composition (in parts by weight) | 17 | 21 | 22 | 23 | 24 | 25 |
|---|---|---|---|---|---|---|
| Condensation product of Ex. 16 | 510 | 521 | — | — | — | — |
| Condensation product of Ex. 19 | — | — | 570 | 581 | — | — |
| Condensation product of Ex. 20 | — | — | — | — | 591 | 603 |
| Hydroxypropyl methacrylate | 415 | — | 388 | — | 379 | — |
| Hydroxypropyl acrylate | — | 393 | — | 367 | — | 358 |
| Toluene diisocyanate | 519 | 530 | 486 | 496 | 474 | 483 |
| Styrene | 1155 | 1155 | 1156 | 1156 | 1155 | 1155 |
| p-Benzoquinone | 0.4 | 0.4 | 0.4 | 0.4 | 0.4 | 0.4 |

Following the procedure of Example 15, laminates were prepared using the vinyl terminated urethane acrylate compositions of Examples 17 and 21–25. The impact resistance of the laminates was determined as in Examples 15 and 18, using the falling ball test, with the following results:

| Laminate Prepared | Shatter Area Diameter (inches) | |
|---|---|---|
| from: | 1.25 ft.-lbs | 2.5 ft-lbs |
| Ex. 17[1] | 0.2 | 0.4 |
| Ex. 21[1] | 0.2 | 0.3 |
| Ex. 22[2] | 0 | 0.5 |
| Ex. 23[2] | 0.4 | 0.9 |
| Ex. 24[3] | 0.4 | 1.0 |
| Ex. 25[3] | 0.6 | 1.2 |

[1] glycerin-modified compositions
[2] propylene glycol-modified compositions
[3] no glycol modifier

What is claimed is:

1. A vinyl terminated, thermosetting polyurethane composition comprising the reaction product of:

(A) an organic polyisocyanate;

(B) an hydroxyalkylated novolac characterized by the formula:

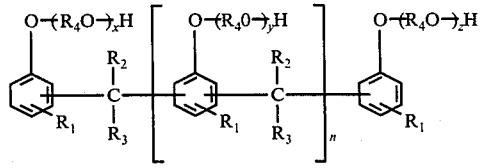

wherein $n$ has an average value of about 0.2 to about 6;

$x$, $y$ and $z$ are integers from 1 to 25;

$R_1$ is independently selected from the group consisting of hydrogen, fluorine chlorine, bromine, a hydrocarbon radical, a halogen substituted hydrocarbon radical; a hydrocarbon ketone radical, and a hydrocarbon carboxylic radical;

$R_2$ and $R_3$ are independently selected from the group consisting of hydrogen, a hydrocarbon radical, and a halogen substituted hydrocarbon radical; and $R_4$ is a hydrocarbon radical; and (C) a monohydric ethylenically unsaturated alcohol characterized by the formula:

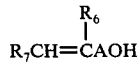

wherein $R_6$ is —H, or —CH$_3$; $R_7$ is —H, —CH$_3$, or —C$_6$H$_5$; and A is a divalent organic radical selected from the group consisting of:

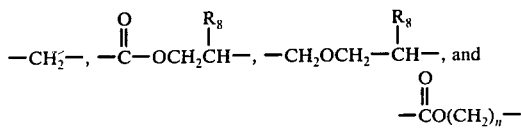

wherein $n$ is 3 to about 12, and $R_8$ is —H, —(CH$_2$)$_m$—CH$_3$,

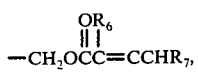

CH$_2$OR$_9$, or —CH$_2$OCH$_2$CH—CHR$_7$ wherein $m$ is an integer from zero to 10 and $R_9$ is a phenyl or halogenated phenyl radical, alkyl or halogenated alkyl radical having from 2 to 4 carbon atoms, benzoxy or halogenated benzoxy radicals, phenoxy or halogenated phenoxy radical.

2. A composition according to claim 1 wherein the $R_1$, $R_2$ and $R_3$ are each hydrogen.

3. A composition according to claim 2 wherein the $x$, $y$, and $z$ are integers of about 1 to about 10.

4. A composition according to claim 3 wherein the $R_4$ is a hydrocarbon radical containing 2 to 6 carbon atoms.

5. A composition according to claim 4 wherein said organic polyisocyanate is a diisocyanate.

6. A composition according to claim 5 wherein said unsaturated alcohol is an hydroxyalkyl acrylate characterized by the formula

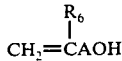

wherein $R_6$ is —H or —CH$_3$; and

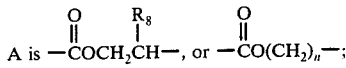

wherein $n$ is 3 to 12; and $R_8$ is —H or —(CH$_2$)$_m$CH$_3$;

wherein $m$ is zero to 10.

7. A composition according to claim 6 wherein said unsaturated alcohol is selected from the group consisting of hydroxyalkyl acrylates and methacrylates wherein the alkyl group is a carbon chain of 2 to 4 carbon atoms.

8. A composition according to claim 7 wherein said unsaturated alcohol is hydroxypropyl methacrylate.

9. A composition according to claim 8 wherein said diisocyanate is toluene diisocyanate.

10. A composition according to claim 1 comprising the reaction product of
    A. an organic polyisocyanate;
    B. an hydroxyalkylated novolac;
    C. monohydric ethylenically unsaturated alcohol; and
    D. an hydroxyalkylated polyol 11. A composition according to claim 10 wherein said hydroxyalkylated polyol is the hydroxyalkylated product of a polyol having up to 6 carbon atoms.

12. A composition according to claim 11 wherein said polyol is glycerine.

13. A composition according to claim 11 wherein said polyol is propylene glycol.

14. A composition according to claim 7 comprising
    A. a diisocyanate;
    B. an hydroxyalkylated novolac;
    C. an unsaturated alcohol selected from the group consisting of hydroxyalkyl acrylates and methacrylates; and
    D. an hydroxyalkylated polyol which is the hydroxyalkylated product of a polyol having up to 6 carbon atoms.

15. A composition according to claim 14 wherein said polyol is glycerine.

16. A composition according to claim 14 wherein said polyol is propylene glycol.

17. A copolymerizable mixture of the composition of claim 1 and an ethylenically unsaturated monomer.

18. A copolymerizable mixture according to claim 17 wherein said ethylenically unsaturated monomer is styrene.

19. A copolymerizable mixture of the composition of claim 6 and an ethylenically unsaturated monomer.

20. A copolymerizable mixture according to claim 19 wherein said ethylenically unsaturated monomer is styrene.

21. A copolymerizable mixture of the composition of claim 9 and styrene.

22. A copolymerizable mixture of the composition according to claim 10 and an ethylenically unsaturated monomer.

23. A copolymerizable mixture according to claim 22 wherein said ethylenically unsaturated monomer is styrene.

24. A copolymerizable mixture of the composition according to claim 14 and styrene.

25. A composition characterized by the formula

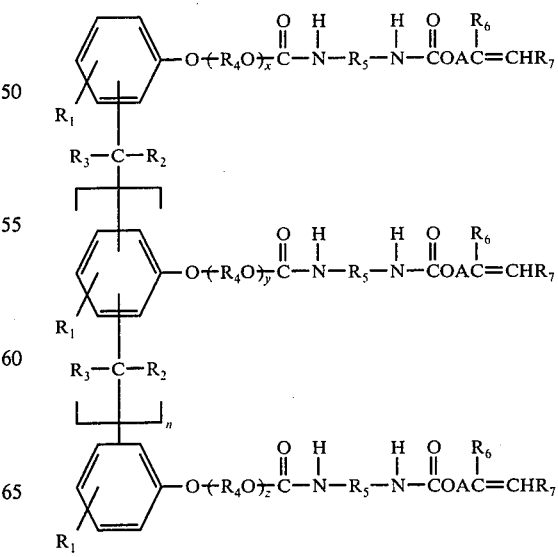

wherein
- $n$ has an average value of about 0.2 to about 6;
- $x$, $y$, and $z$ are integers of 1 to 25;
- $R_1$ is independently selected from the group consisting of hydrogen, fluorine, chlorine, bromine, a hydrocarbon radical, a halogen substituted hydrocarbon radical, a hydrocarbon ketone radical and a hydrocarbon carboxylic radical;
- $R_2$ and $R_3$ are independently selected from the group consisting of hydrogen, a hydrocarbon radical and a halogen substituted hydrocarbon radical;
- $R_4$ is a hydrocarbon radical;
- $R_5$ is a divalent orgaic radical selected from the group consisting of aryl, polyaryl, — aliphatic and cyloaliphatic radicals,
- $R_6$ is a hydrogen or methyl;
- $R_7$ is hydrogen, methyl or benzyl phenyl and
- A is a divalent organic radical selected from the group consisting of

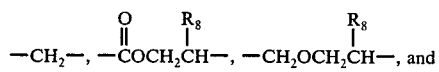

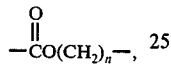

wherein $n$ is 3 to 12, and, -
$R_8$ is an organic radical selected from the group consisting of

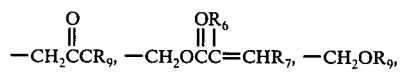

and
and

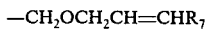

wherein
- $m$ is zero to 10,
- $R_6$ is hydrogen or methyl
- $R_7$ is hydrogen, methyl or benzyl phenyl and
- $R_9$ is phenyl, halogenated phenyl, alkyl or halogenated alkyl, having 2 to 4 carbon atoms, benzoxy or halogenated benzoxy, phenoxy or halogenated phenoxy.

26. A composition according to claim 25 wherein $R_1$, $R_2$, and $R_3$ and $R_7$ are each hydrogen, $R_4$ is a hydrocarbon radical containing 2 to 6 carbon atoms, $R_6$ is —H, or —CH$_3$, $x$, $y$, and $z$ are integers of 1 to 10, and
A is

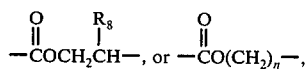

wherein $n$ is 3 to 12, and $R_8$ is —H, or —(CH$_2$)$_m$CH$_3$, wherein $m$ is zero to 10.

27. A composition according to claim 26 wherein $R_8$ is —H.

28. A composition according to claim 27 wherein $R_8$ is —(CH$_2$)$_m$CH$_3$ and $m$ is zero to 10.

29. A composition according to claim 26 wherein $R_6$ is —H.

30. A composition according to claim 26 wherein $R_6$ is —CH$_3$.

31. A thermoset polymer composition comprising the reaction product of the composition of claim 25 and an ethylenically unsaturated monomer.

32. A thermoset polymer composition according to claim 31 wherein said ethylenically unsaturated monomer is styrene.

* * * * *